Sept. 11, 1956  C. P. SIMMONS ET AL  2,762,319
FOOD MOLD
Original Filed March 10, 1947
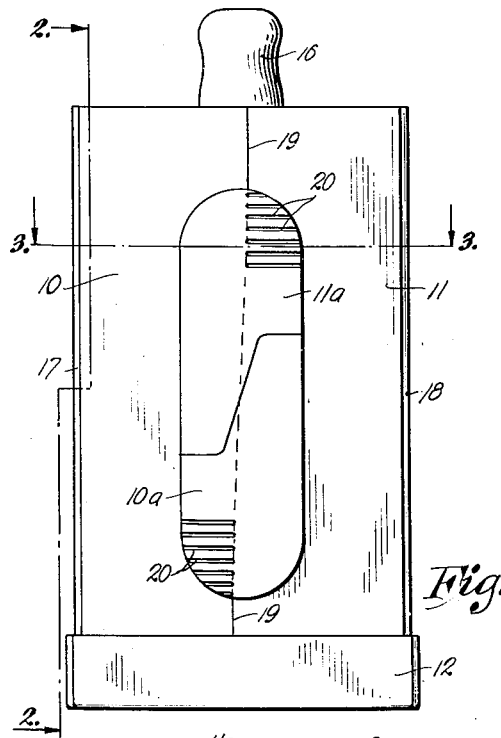
Fig. 1.
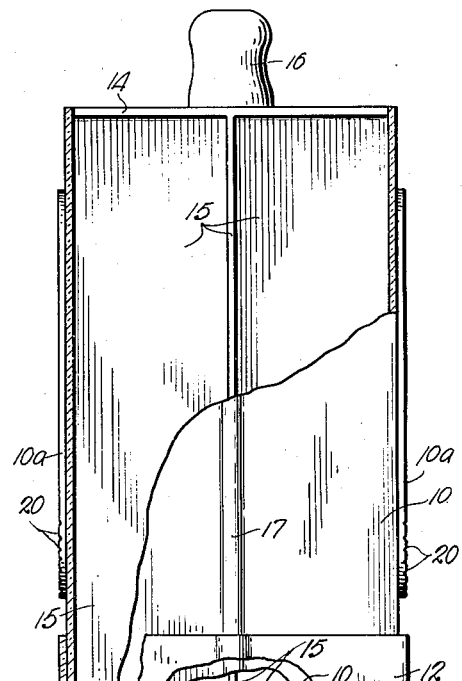
Fig. 2.
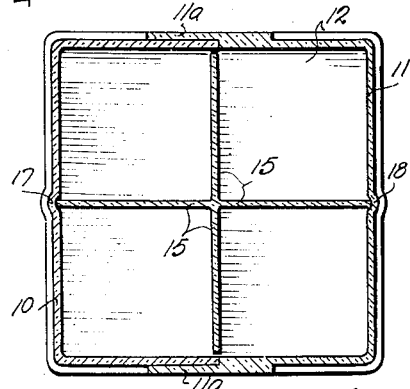
Fig. 3.
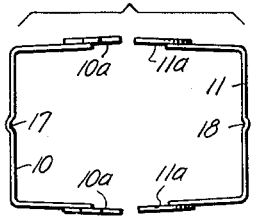
Fig. 5.
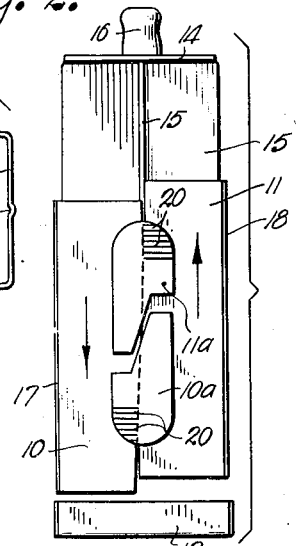
Fig. 4.
Fig. 6.
INVENTORS.
Cora P. Simmons
Aldred J. Simmons
BY
Thos. E. Scofield
ATTORNEY.

United States Patent Office 2,762,319
Patented Sept. 11, 1956

2,762,319

FOOD MOLD

Cora P. Simmons and Aldred J. Simmons, Plymouth, Wis.; said Cora P. Simmons assignor to said Aldred J. Simmons Original application March 10, 1947, Serial No. 733,514, now Patent No. 2,642,899, dated June 23, 1953. Divided and this application March 26, 1953, Serial No. 344,772

4 Claims. (Cl. 107—19)

The present invention relates in general to the molding of food products into desired shapes, and it deals more particularly with devices for molding plastic or semisolid foods, such as oleomargarine, for example, into units of convenient form.

This application is a division of our copending application Serial No. 733,514 filed March 10, 1947 and now United States Patent No. 2,642,899, dated June 23, 1953.

There have been molds of the character indicated in the past, of course, but it is the object of the present invention to provide an improved form of mold which combines the advantages of being easier to use and easier to clean, yet which is simple in form, rugged and comparatively inexpensive to construct.

More specifically, it is an object of the invention to provide a mold which is conveniently separable into such parts as will make the removal of the molded food products therefrom much easier than has heretofore been the case, the shape of these parts also being such as will facilitate the cleaning thereof.

An important feature of the invention resides in the provision of an improved arrangement for interlocking the parts of the mold. According to this feature an elongated mold divided longitudinally into halves is provided with interlocking members whereby the mold is separable only by a longitudinal movement of one of the halves with respect to the other.

Another important feature resides in the provision of means for forcing the halves of the mold laterally apart as one half is moved longitudinally with respect to the other.

Still another feature resides in the provision of finger grips on the parts which facilitate their separation.

Other objects and features will appear in the course of the following description of the invention.

In the accompanying drawings which form a part of the specification and are to be read in conjunction therewith, and in which like reference numerals are employed to indicate like parts of the various views, Fig. 1 is a side elevational view of a mold constructed according to the invention, Fig. 2 is a view partly in elevation and partly in section taken along the line 2—2 of Fig. 1 in the direction of the arrows, Fig. 3 is a sectional view taken along the line 3—3 of Fig. 1 in the direction of the arrows, Fig. 4 is a side elevational view corresponding to Fig. 1 drawn to a reduced scale and showing the various parts of the mold partially separated from one another, Fig. 5 is a top view showing the two side pieces completely separated, and Fig. 6 is a side elevational view illustrating a mold of slightly modified construction.

Referring more particularly to the drawings, the mold has a pair of identical side pieces 10 and 11, each comprising a channel which is U-shaped in transverse cross section. When placed together as shown in the figures these form a substantially square tube, either end of which is adapted to fit into a removable bottom-piece 12. Thus assembled, the upturned flange or rim on the bottom-piece fits snugly around the tube at one end, serving as a band to hold the two halves together.

To further assist in holding them together, interlocking members 10a and 11a are provided on the side pieces 10 and 11 respectively. The side piece 10 and its interlocking members 10a preferably are molded in one piece from resinous material thereby to form an integral unit, the same being true of the opposite side piece 11 and its associated interlocking members 11a; each of these units obviously might be made of other material, however, and it will be evident that the individual interlocking members might be formed separately from their respective side pieces and secured thereto in any desired way rather than being made integral therewith.

Considering the effect of the interlocking members it will be seen that even when the bottom piece 12 is removed from the tube the two halves of the tube nevertheless cannot be separated by direct lateral movement but only by moving one half longitudinally relative to the other as indicated by the arrows in Fig. 4. As the halves are moved longitudinally the interlocking members permit them also to move laterally a small amount and when in the course of the longitudinal movement the interlocking members are clear of one another the two halves then may be entirely separated as shown in Fig. 5.

To reassemble the tube the longitudinal edges of the two channel sections are brought together in such a way that the ends of the individual sections are staggered with respect to one another; then they are moved relative to one another in directions opposite to those indicated by the arrows in Fig. 4 until the locking members on the respective channel sections come into abutment. This correctly aligns the ends of the channel sections and locks them together as previously indicated.

In addition to the two sides and the bottom already described, the mold has a top 14 and, in fixed relationship thereto, four perpendicular partitions 15 and a knob 16. Preferably, the top, the partitions and the knob are molded in one piece from resinous material but they naturally may be made in one piece from any other suitable material or they may be formed in separate pieces and secured together in any suitable fashion. The four partitions form a cross as shown in Fig. 3, and their lower extremities are tapered to form rather blunt knife edges, as shown in Fig. 2. The function of this unit, which will be referred to hereinafter as the divider, now will be explained.

Let it be assumed that the housewife has just finished coloring a quantity of oleomargarine, a process which involves kneading the coloring material into the oleomargarine by hand. Further, let it be assumed that the sides of the mold have been assembled as described above and the resultant tube has been inserted in the bottom-piece 12 to form a rectangular container open at the top. The colored oleomargarine which is in a plastic condition due to the kneading is introduced into the container and pressed downwardly with a spoon or other convenient tool to eliminate air pockets in the mass. Then the end of the divider is inserted into the open top of the container and by means of the knob 16 it is pressed downwardly so the partitions 15 pass through the material, tapered ends first, dividing the mass into four equal sections. During this downward movement the divider is guided by a pair of longitudinal grooves 17 and 18 disposed opposite one another in the sides of the container, which grooves receive the longitudinal edges of two of the partitions 15 and prevent the divider from twisting or tilting as it descends.

The mold now is placed in a refrigerator or other cool place until the oleomargarine contained therein becomes firm, attention being directed to the fact that the material is wholly enclosed during this period so it cannot take up odors from nearby foods or suffer any of the other adverse effects which would be possible if it were uncovered. When the oleomargarine has cooled sufficiently to be firm, the mold is tapped slightly to break the bond of the oleomargarine and the interior surface of the mold or it is allowed to stand in a warm room for a few minutes to induce surface softening of the oleomargarine for the same purpose. Then the bottom-piece 12 is removed and the two side pieces are separated by sliding them longitudinally with respect to one another as previously described, whereupon the four oblong blocks or rectangular "stocks" of oleomargarine may easily be removed for use. The removal of the four sticks is facilitated by providing the side pieces with a pronounced draft, i. e., flaring them as indicated in exaggerated form in Fig. 5.

During the separation of the side pieces it is most convenient to hold the mold in a horizontal position with one side-piece down and to remove the other side-piece therefrom by sliding it horizontally until it can be lifted free. This leaves the divider and all four sticks of oleomargarine resting in the lower side-piece, and permits the upper two sticks to be lifted from the divider first, after which the lower two sticks may be removed when the divider is separated from the lower side piece. If desired, the sticks may be removed from the mold for use only as needed, the mold being reassembled after each such removal and stored in a cool place with the remaining sticks therein.

To facilitate the sliding of the two valves of the unit longitudinally with respect to one another for purposes of separation, knurling is provided in the form of ribs or grooves 20 on the locking members 10a and 11a, whereby the operator may obtain a better grip on the parts. It is important that this knurling be located as shown, for if it were shifted laterally to the other side of the locking members it would result in pressure being applied by the operator at points which would impair separation by producing a bind between the locking members carried on one half of the mold and the side wall of the other half of the mold.

Supposing for a moment that the two side pieces of the mold were arranged for separation by a lateral movement directly away from one another instead of by the sliding longitudinal movement described above, it will be apparent that the separation would be made very difficult when the mold was full of oleomargarine as the result of a vacuum being created between the surface of the oleomargarine and the interior surface of the mold. The sliding movement embodied in the present arrangement avoids this difficulty. However, it has been found advantageous to supplement this sliding movement with a very small lateral movement thereby to break the bond between the oleomargarine and the interior wall of the mold; and the means whereby this is accomplished now will be described.

Referring to the line 19 which separates the two halves of the mold, it will be seen upon close examination of Fig. 1 that the upper end of this line is situated slightly to the right of the mold's center while the lower end is situated slightly to the left of center, the intermediate portion of the line (i. e., the part hidden behind members 10a and 11a) being diagonal. In other words, the meeting edges of the two side pieces are so inclined that when the side pieces are moved longitudinally relative to one another as indicated by the arrows in Fig. 4 a wedging action takes place which automatically forces the right and left-hand walls of the container apart. This lateral movement is very slight but it is sufficient to free the side pieces from the oleomargarine contained in the mold, and hence greatly aids in the separation of the parts.

Although, as shown in Fig. 1 and described above, it is preferred to have the visible portions of the line 19 vertical and to have only the hidden intermediate portion thereof inclined, it will be clear that the line might be made diagonal or inclined throughout its whole length; alternatively the two side pieces might be arranged so that the meeting line between them would have a vertical center section and inclined end sections. In either of the latter cases the arrangement would function with the same wedging action as explained hereinbefore.

The unit described obviously is not limited in its use to the molding of oleomargarine. To the contrary it may be employed equally well to prepare neat rectangular sticks of butter or lard from the bulk material, or it may be used in similar fashion to prepare convenient oblong portions of ice cream, frozen vegetables, fruits, cooked foods, ground meats, puddings, pastry dough, flavored or unflavored ice cubes and the like. Some of these uses may make it desirable to have a more fluid-tight joint between the two side pieces of the mold, and when such is the case their meeting edges may be provided with a conventional tongue and groove or lap joint. It also is within the scope of the invention to provide the parts of the unit with supplementary gaskets for a tighter seal, though in the interest of simplicity it is preferred to avoid this unless such is necessary for a particular use of the unit.

Various modifications of the locking members also are contemplated, one of these being illustrated in Fig. 6. According to this modification the locking member 21a is fixedly positioned on the side piece 21 and the member 22a is fixedly positioned on the side piece 22. The dividing line 23 between the two side pieces is straight and vertical throughout its length, and the meeting lines 24 and 25 between the interlocking members also are vertical. This construction holds the two halves of the mold tightly together even in the presence of very great lateral stresses tending to separate them, and hence would be preferable for certain uses of the mold. The two side pieces are separated by longitudinal sliding movement relative to one another as described hereinbefore, and it will be noted that the interlocking members on the side pieces must be wholly clear of one another before any lateral movement of the side pieces is possible.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof it is to be understood that all matter herein set forth or shown in the accompanying drawings is to be interpreted as illustrative and not in a limiting sense.

Having thus described our invention, we claim:

1. A molding device comprising a pair of channels U-shaped in transverse cross section, means for detachably connecting said channels together to form a tube open at both ends, removable covers for both ends of said tube, one of said covers being smaller than the bore of the tube whereby it is adapted to enter the tube and said one cover having normal thereto a pair of intersecting partitions extending from that cover a distance whereby the length of the partitions extending from the face of the cover is less than the inside depth of the tube.

2. A molding device as set forth in claim 1 including grasping means fixed to the face of said smaller cover opposite the partitions extending therefrom.

3. A device of the character described comprising an elongated tube divided longitudinally throughout its entire length to provide a pair of opposing, separable tube forming sections having the longitudinal edges abutting one another, the abutting edges forming corresponding dividing lines in the tube wall on opposite sides of the tube, at least a portion of the length of the dividing lines between said sections being on a slant with respect to the longitudinal axis of the tube so as to produce in each section a portion of greater width than the remaining portion with the wider portion of each section being at opposite ends of the tube whereby longitudinal motion of the wider portion of one section toward the wider portion of the other forces the sections apart and encircling means into which said tube is insertable, said encircling means adapted to encircle said tube closely thereby to prevent said sections from moving apart.

4. A device of the character described as in claim 3 wherein said encircling means comprises a removable cover for at least one end of the tube, said cover having a rim adapted to closely encircle said tube whereby to prevent said two sections from moving apart.

References Cited in the file of this patent

UNITED STATES PATENTS

| | | |
|---|---|---|
| 194,244 | Jasper | Aug. 14, 1877 |
| 364,550 | Scheibler | June 7, 1887 |
| 800,070 | Cassell et al. | Sept. 19, 1905 |
| 889,899 | Brown | June 9, 1908 |
| 1,041,033 | Crist | Oct. 15, 1912 |
| 1,708,304 | Elliott | Apr. 9, 1929 |
| 1,866,316 | Miller | July 5, 1932 |
| 2,111,910 | Fisher | Mar. 22, 1938 |
| 2,604,058 | Orange | July 22, 1952 |
| 2,642,899 | Simmons et al. | June 23, 1953 |